US007729114B2

(12) United States Patent
Shi

(10) Patent No.: US 7,729,114 B2
(45) Date of Patent: Jun. 1, 2010

(54) KEYPAD ASSEMBLY AND PORTABLE ELECTRONIC DEVICE USING THE SAME

(75) Inventor: Zheng Shi, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 211 days.

(21) Appl. No.: 11/946,304

(22) Filed: Nov. 28, 2007

(65) Prior Publication Data

US 2008/0297994 A1 Dec. 4, 2008

(30) Foreign Application Priority Data

Jun. 1, 2007 (CN) ........................ 2007 1 0074898

(51) Int. Cl.
*G06F 1/16* (2006.01)

(52) U.S. Cl. .............................. 361/679.4; 361/679.08; 361/679.55; 361/679.56

(58) Field of Classification Search ............ 361/679.08; 379/367; 400/112–114
See application file for complete search history.

(56) References Cited

U.S. PATENT DOCUMENTS 5,119,078 A * 6/1992 Grant .......................... 345/172
5,508,703 A * 4/1996 Okamura et al. ............ 341/176
5,621,196 A 4/1997 Nishijima et al.
5,660,488 A * 8/1997 Miller ......................... 400/486
6,059,470 A * 5/2000 Myint ......................... 400/488
6,179,496 B1 * 1/2001 Chou .......................... 400/472
6,593,914 B1 * 7/2003 Nuovo et al. ................ 345/169
D487,454 S * 3/2004 Wang et al. ................ D14/247
D488,804 S * 4/2004 Pitt et al. ................... D14/247
6,802,662 B1 * 10/2004 Cheng et al. ................ 400/489
D505,417 S * 5/2005 Wang et al. ................ D14/247
6,925,315 B2 * 8/2005 Langford ................. 455/575.1
2003/0044000 A1 * 3/2003 Kfoury et al. .......... 379/433.04
2004/0242288 A1 * 12/2004 Balle et al. ............... 455/575.1
2008/0079604 A1 * 4/2008 Madonna et al. ....... 340/825.72
2008/0106519 A1 * 5/2008 Murray ........................ 345/169
2008/0150766 A1 * 6/2008 Wu ............................. 341/22

FOREIGN PATENT DOCUMENTS

CN 1650251 A 8/2005

* cited by examiner

*Primary Examiner*—Jayprakash N Gandhi
*Assistant Examiner*—Anthony Q Edwards
(74) *Attorney, Agent, or Firm*—Jeffrey T. Knapp

(57) ABSTRACT

A keypad assembly (15) applied to a portable electronic device and mounted in a shell of the portable electronic device is provided. The keypad assembly comprises a keypad cover (151) and a printed circuit board (152). The keypad cover is provided with at least one contact portion (1516) thereon. The printed circuit board provided with a plurality of signal-sensing portions (1522) thereon. The shell is provided with at least one guide hole (116) corresponding to the plurality of signal-sensing portions. The shell is configured between the keypad cover and the printed circuit board, and the keypad cover is rotatably mounted in the shell. The signal-sensing portion is pressed by the contact portion through the guide hole. A portable electronic device using the keypad assembly is also disclosed.

18 Claims, 4 Drawing Sheets

KEYPAD ASSEMBLY AND PORTABLE ELECTRONIC DEVICE USING THE SAME

BACKGROUND OF THE INVENTION

1. Field of the Invention

The present invention generally relates to keypad assemblies and, particularly, to a keypad assembly for use in portable electronic device, such as mobile telephone, electronic notebook, and a portable electronic device with the same.

2. Discussion of the Related Art

With the development of wireless communication and information processing technologies, portable electronic devices, such as mobile telephones and personal digital assistants (PDAs), are now in widespread use. These portable electronic devices enable consumers to enjoy high technology services, anytime and anywhere. A keypad assembly as an input terminal has been an indispensable member of a portable electronic device.

Conventionally, a keypad assembly usually includes a plurality of keys, such as numeral keys, character keys and function keys. The plurality of keys of a keypad assembly of a portable electronic device is typically inserted through a plurality of holes of a housing of the portable electronic device. The keypad assembly has many elements and relatively complex structure.

Therefore, a keypad assembly with a simple and reliable configuration is desired in order to overcome the above-described problems.

SUMMARY

In one aspect thereof, a keypad assembly applied to a portable electronic device and mounted in a shell of the portable electronic device is provided. The keypad assembly comprises a keypad cover and a printed circuit board. The keypad cover is provided with at least one contact portion thereon. The printed circuit board is provided with a plurality of signal-sensing portions. The shell is provided with at least one guide hole corresponding to the plurality of signal-sensing portions. The shell is configured between the keypad cover and the printed circuit board. The keypad cover is rotatably mounted in the shell. The signal-sensing portion is pressed by the contact portion through the guide hole.

In another embodiment thereof, a portable electronic device comprises a shell and a keypad assembly. The keypad assembly is mounted in the shell. The keypad includes a keypad cover and a printed circuit board. The keypad cover is provided with at least one contact portion thereon. The printed circuit board is provided with a plurality of signal-sensing portions. The shell is provided with at least one guide hole corresponding to the plurality of signal-sensing portions. The shell is configured between the keypad cover and the printed circuit board. The keypad cover is rotatably mounted in the shell. The signal-sensing portion is pressed by the contact portion through the guide hole.

Other advantages and novel features of the embodiments will become more apparent from the following detailed description thereof when taken in conjunction with the accompanying drawings.

BRIEF DESCRIPTION OF THE DRAWINGS

Many aspects of the keypad assembly and portable electronic device using the same can be better understood with reference to the following drawings. Drawings are not necessarily drawn to scale, the emphasis instead being placed upon clearly illustrating the principles of the present keypad assembly and portable electronic device using the same. Moreover, in the drawings, like reference numerals designate corresponding parts throughout the several views.

DETAILED DESCRIPTION OF THE EMBODIMENTS

The present keypad assembly is suitable for portable electronic devices such as mobile phones, PDAs, and so on.

Figure 1:
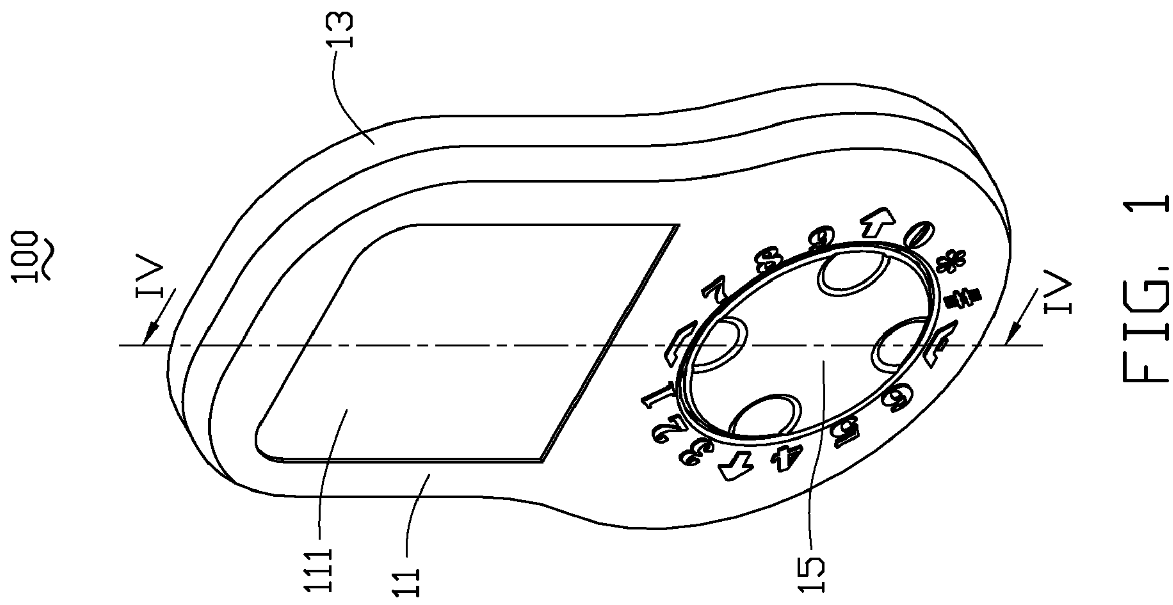
FIG. 1 is an isometric, assembled view of an electronic device incorporating a keypad assembly, in accordance with a present embodiment.

Referring to FIG. 1, a portable electronic device herein is a mobile phone 100. The mobile phone 100 includes an upper shell 11, a lower shell 13 and a keypad assembly 15. The upper shell 11 cooperates with the lower shell 13. The keypad assembly 15 is received in the combination of the upper shell 11 and the lower shell 13.

Figure 2:
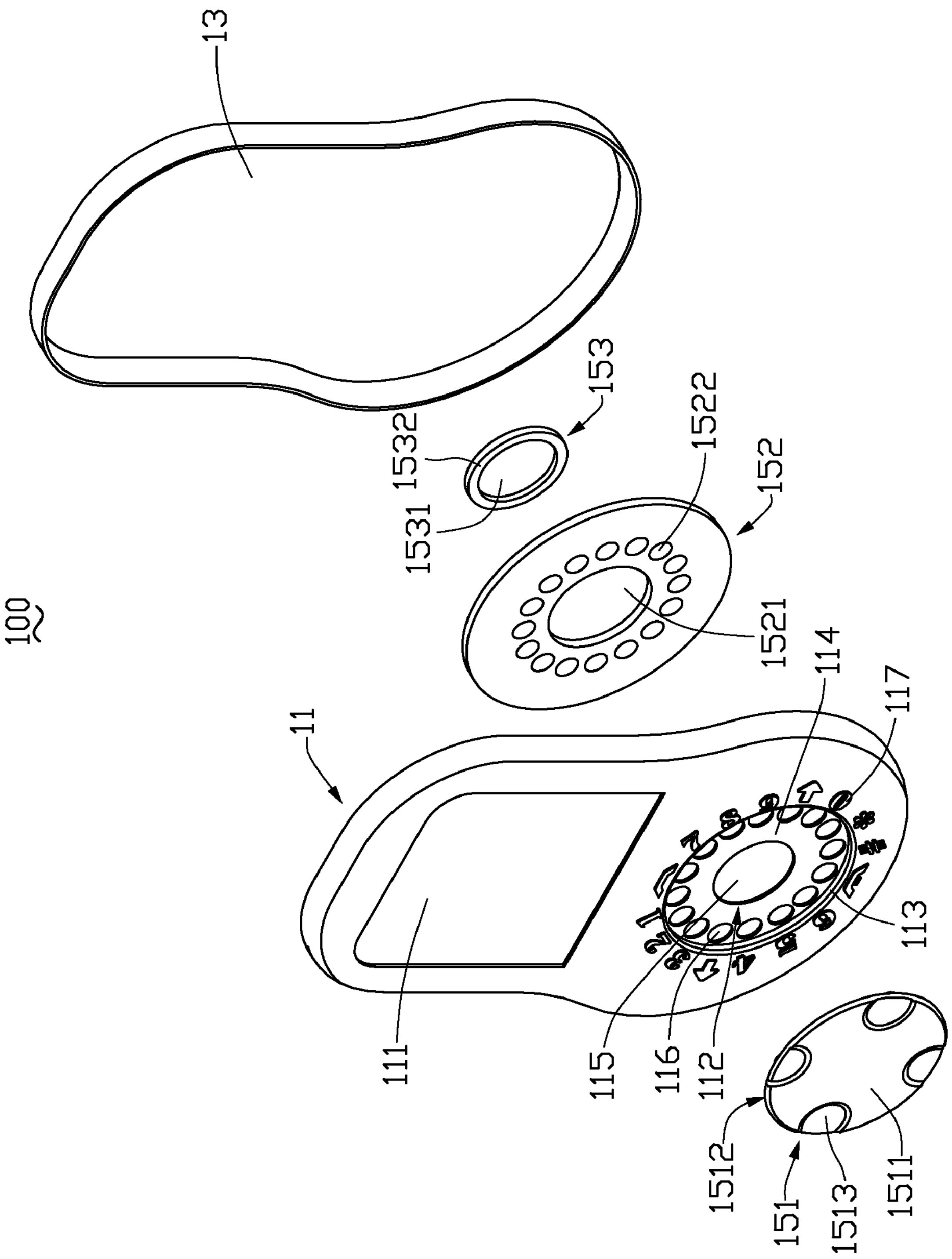
FIG. 2 is an isometric, exploded view of the electronic device incorporating a keypad assembly shown in FIG. 1 in a first visual angle.
Figure 3:
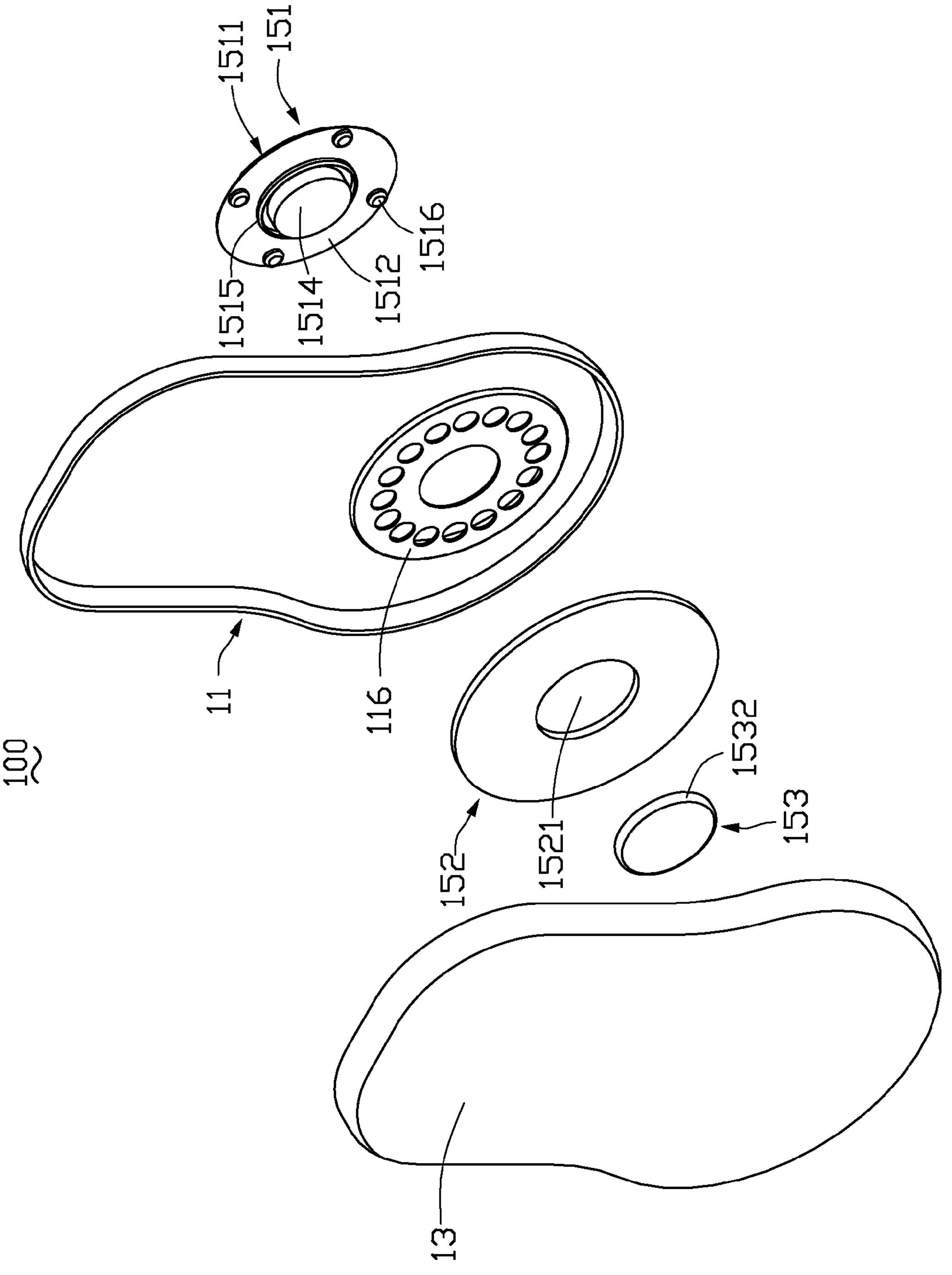
FIG. 3 is similar to FIG. 1 but shown in a second visual angle.

Further referring to FIG. 2 and FIG. 3, the upper shell 11 is an approximately rectangle housing. A screen 111 is provided in the upper shell 11. The screen 111 is provided to display characters and images. The upper shell 11 defines a groove 112 corresponding having a sidewall 113 and a base 114. The groove 112 and the screen 111 are located next to each other on the upper shell 11. The base 114 of the groove 112 is round in shape. A central hole 115 is defined in the center of the base 114. A plurality of guide holes 116 is defined around the central hole 115 and adjacent to the edge of the base 114. A plurality of key symbols 117 is shown (e.g., printed) on the surface of the upper shell 11 and around the groove 112, such as 1, 2, 3, # and so on, corresponding to the plurality of the guide holes 116.

The lower shell 13 is an approximately rectangle housing. The lower shell 13 cooperates with the upper shell 11 to from a whole shell of the mobile phone 100.

The keypad assembly 15 includes a keypad cover 151, a printed circuit board 152 and a stopper member 153. The base 114 is configured between the keypad cover 151 and the printed circuit board 152. The keypad cover 151 is an approximately circular housing made of elastic material. The shape and size of the keypad 151 is similar with the groove 112. The keypad assembly 15 is configured for being receivable in the groove 112. The keypad cover 151 includes a first surface 1511 and a second surface 1512 on the opposite side of the first surface 1511. At least one pressing portion 1513 is defined on the first surface 1511 and adjacent to the edge of first surface 1511. A shape and size of the pressing portion 1513 is constructed similar to a fingertip of a user for being more users friendly.

A columnar rotating axis 1514 is formed on a center of the second surface 1512 of the keypad cover 151. The rotating axis 1514 is configured for being inserted through the central hole 115. An annular retaining portion 1515 is formed around the rotating axis 1514 and on the second surface 1512. There is a proper space between the rotating axis 1514 and the retaining portion 1515. The height of the retaining portion 1515 is less than that of the rotating axis 1514. Each contact portion 1516 on the second surface 1512 is provided corresponding to the at least one pressing portion 1513 on the first surface 1511. The height of the contact portion 1516 is identical to the retaining portion 1515.

The printed circuit board 152 is provided for the keypad assembly 15. A through hole 1521 is defined corresponding to the central hole 115 and the rotating axis 1514. The diameter of the through hole 1521 is slightly larger than the diameter of the rotating axis 1514. A plurality of signal-sensing portions 1522 is provided annularly on the printed circuit board 152 corresponding to the plurality of guide holes 116 in the base 114 and the plurality of key symbols 117 shown on the surface of the upper shell 11. The signal-sensing portion 1522 is a vaulted protrusion. When the user press the pressing portion 1513, a signal-sensing portion 1522 is sensed by a corresponding contact portion 1516 to connect the circuit board 152 electronically, so that a signal input is implemented.

The stopper member 153 is a circular housing with an annular protrusion 1532 formed thereon. A latching cavity 1531 is defined in a center of the annular protrusion 1532. A diameter of the stopper member 153 is identical to the through hole 1521. A diameter of the latching cavity 1531 is identical to the rotating axis 1514. The stopper member 153 is provided for being received in the through hole 1521. The rotating axis 1514 is provided for being received in the latching cavity 1531 through the central hole 115. The rotating axis 1514 and the stopper member 153 are provided for being fixed with each other.

Figure 4:
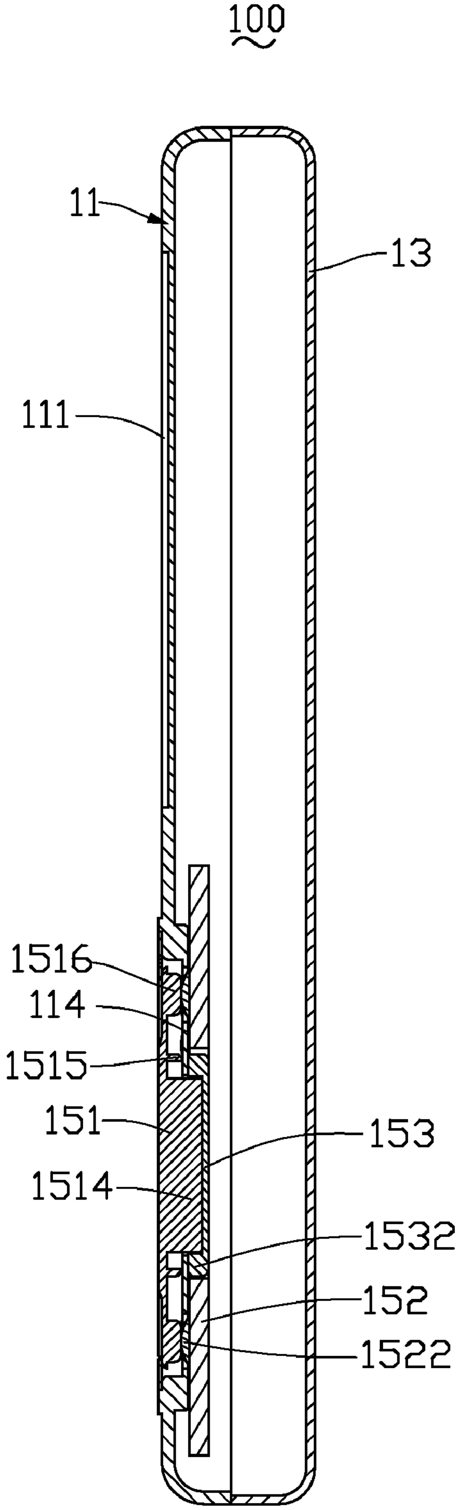
FIG. 4 is a cross-sectional view taken along line IV-IV of FIG. 1.

Further referring to FIG. 4, in assembly, the rotating axis 1514 is inserted through the central hole 115 of the groove 112, and the rotating axis 1514 extends out of the central hole 115. The keypad cover 151 is received in the groove 112, the retaining portion 1515 contacts with the base 114 of the groove 112 to support the keypad cover 151. The stopper member 153 is placed (i.e. latching, gluing, screw thread connecting, and so on) over the rotating axis 1514 and protrudes out of the central hole 115. The rotating axis 1514 is received in the latching cavity 1531. The annular protrusion 1532 contacts with a rear of the base 114 to stop the keypad cover 151 from popping off the groove 112. The printed circuit board 152 is mounted on the rear of the upper shell 11. Each of the signal-sensing portions 1522 is aligned with each of the corresponding guide holes 116 and protrudes out of each of the corresponding guide holes 116. The lower shell 13 is mounted with the upper shell 11. An assembly of the keypad assembly 15 of the portable electronic device 100 is completed.

In use, the keypad cover 151 is rotated until a pressing portion 1513 is aligned with one selected key symbol 117 corresponding to a desired character. If a user presses the pressing portion 1513, the keypad cover 151 is in an elastically deformed state. Due to the user's pressing force and the press of the retaining portion 1515, a signal-sensing portion 1522 corresponding to the selected key symbol 117 is pressed by a contact portion 1516 corresponding to the pressed pressing portion 1513. Then the printed circuit board 152 is electronically connected and generates an electronic signal. The electronic signal is then displayed on the screen 111. Due to the elasticity of the pressing portion 1513, the keypad cover 151 returns to the original state. An input of a character to the mobile phone 100 is implemented.

It is should be understood, the plurality of guide holes 116 can be replaced with a annular guide hole facing to the plurality of signal-sensing portions 1522. In addition, the rotating axis 1514 can be provided on the upper shell 11, and the central hole 115 can be defined on the keypad cover 151 cooperating with the rotating axis 1514 on the upper shell 11. The keypad cover 151 can also be rotated about the rotating axis 1514 on the upper shell 11.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A keypad assembly applied to a portable electronic device and mounted in a shell of the portable electronic device, the keypad assembly comprising:

a keypad cover provided with at least one contact portion thereon; and a printed circuit board provided with a plurality of signal-sensing portions;

wherein the shell is positioned between the keypad cover and the printed circuit board and provided with at least one guide hole, the keypad cover is rotatably mounted to the shell;

each of the plurality of signal-sensing portions can be alternately pressed by rotating the keypad cover to align a respective contact portion with a respective guide hole and a respective signal-sensing portion, and pressing the respective contact portion through the respective guide hole to contact the respective signal-sensing portion.

2. The keypad assembly as claimed in claim 1, wherein the signal-sensing portions are together arranged in an annular shape.

3. The keypad assembly as claimed in claim 1, wherein a rotating axis is formed on the keypad cover, a central hole is defined in the shell corresponding to the rotating axis, the rotating axis is rotatably received in/through the central hole.

4. The keypad assembly as claimed in claim 3, wherein a groove is defined in the shell around the central hole, and the groove is provided for receiving the keypad cover.

5. The keypad assembly as claimed in claim 3, further comprising a stopper member which is provided for fixing the keypad cover with the shell.

6. The keypad assembly as claimed in claim 5, wherein the stopper member is provided with a latching cavity defined therein, the rotating axis is received in the latching cavity, and the rotating axis is fixed with the stopper member through the central hole.

7. The keypad assembly as claimed in claim 1, wherein a rotating axis is provided on the shell, a hole is defined in the keypad cover corresponding to the rotating axis, and the rotating axis is rotatably received in the hole.

8. The keypad assembly as claimed in claim 1, wherein a retaining portion is protruded around the rotating axis, and the retaining portion contacts with the shell.

9. The keypad assembly as claimed in claim 1, wherein a plurality of key symbols is shown on the shell corresponding to the signal-sensing portions provided on the printed circuit board.

10. A portable electronic device comprising:

a shell; and a keypad assembly mounted in the shell, including:

a keypad cover provided with at least one contact portion thereon; and a printed circuit board provided with a plurality of signal-sensing portions;

wherein the shell is positioned between the keypad cover and the printed circuit board and provided with at least one guide hole, the keypad cover is rotatably mounted to the shell; each of the plurality of signal-sensing portions can be alternately pressed by rotating the keypad cover to align a respective contact portion with a respective guide hole and a respective signal-sensing portion, and pressing the respective contact portion through the respective guide hole to contact the respective signal-sensing portion.

11. The portable electronic device as claimed in claim 10, wherein the signal-sensing portions are together arranged in an annular shape.

12. The portable electronic device as claimed in claim 10, wherein a rotating axis is formed on the keypad cover, a central hole is defined in the shell corresponding to the rotating axis, the rotating axis is rotatably received in/through the central hole.

13. The portable electronic device as claimed in claim 12, wherein a groove is defined in the shell around the central hole, the groove is provided for receiving the keypad cover.

14. The portable electronic device as claimed in claim l2, further comprising a stopper member provided for fixing the keypad cover with the shell.

15. The portable electronic device as claimed in claim 14, wherein the stopper member is provided with a latching cavity defined therein, the rotating axis is received in the latching cavity, and the rotating axis is fixed with the stopper member through the central hole.

16. The portable electronic device as claimed in claim 10, wherein a rotating axis is provided on the shell, a hole is defined in the keypad cover corresponding to the rotating axis, and the rotating axis is rotatably received in the hole.

17. The portable electronic device as claimed in claim 10, wherein a retaining portion is protruded around the rotating axis, and the retaining portion contacts with the shell.

18. The portable electronic device as claimed in claim 10, wherein a plurality of key symbols is shown on the shell corresponding to the signal-sensing portions provided on the printed circuit board.

* * * * *